(12) United States Patent
Ahm

(10) Patent No.: US 6,578,317 B1
(45) Date of Patent: Jun. 17, 2003

(54) GERMINATING UNIT, GERMINATING TAPE AND A METHOD OF PRODUCING GERMINATING UNITS OR GERMINATING TAPES, AS WELL AS AN ASSEMBLY FOR CARRYING OUT SAID METHOD

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 09/720,438

(22) PCT Filed: Jun. 23, 1999

(86) PCT No.: PCT/DK99/00351

§ 371 (c)(1),
(2), (4) Date: Dec. 22, 2000

(87) PCT Pub. No.: WO00/00008

PCT Pub. Date: Jan. 6, 2000

(30) Foreign Application Priority Data

Jun. 29, 1998 (DK) .......................... 1998 00840

(51) Int. Cl.[7] ................................................. A01C 1/04
(52) U.S. Cl. ............................................................ 47/56
(58) Field of Search ................ 47/56, 73, 78, 47/64; D15/127; 270/18

(56) References Cited

U.S. PATENT DOCUMENTS

| 1,386,105 A | * | 8/1921 | Gray | |
|---|---|---|---|---|
| 4,283,880 A | * | 8/1981 | Fjeldsa | 47/56 |
| 4,398,708 A | * | 8/1983 | Goldman et al. | 270/18 |
| 4,692,212 A | * | 9/1987 | Swenson et al. | 162/206 |
| 4,694,606 A | * | 9/1987 | Wood et al. | 111/138 |
| 4,866,879 A | * | 9/1989 | Wood et al. | 111/199 |
| 4,910,911 A | * | 3/1990 | Ahm et al. | 47/56 |
| 5,081,791 A | | 1/1992 | Baron et al. | 47/66 |
| 5,101,594 A | * | 4/1992 | Ahm | 47/56 |
| 5,165,351 A | * | 11/1992 | Billings | 111/199 |
| D426,244 S | * | 6/2000 | Grant | D15/127 |

FOREIGN PATENT DOCUMENTS

| EP | 0182263 | 5/1986 | A01G/9/10 |
|---|---|---|---|
| GB | 2064934 | 6/1981 | A01C/1/04 |
| GB | 2123663 | 2/1984 | A01C/1/04 |
| GB | 2142213 | 1/1985 | A01C/1/04 |

* cited by examiner

Primary Examiner—Charles T. Jordan
Assistant Examiner—Bret Hayes
(74) Attorney, Agent, or Firm—Cooper & Dunham LLP; Donald S. Dowden

(57) ABSTRACT

A germinating unit for germination of seeds comprises two material layers (2, 3) of paper and a seed (4) placed between said two material layers. A mixture (5) of a carrier and additives is placed between the material layers, said additives being permanently or loosely bound to said carrier by means of a binder. The seed (4) and the mixture (5) are bound to at least one of the material layers (2, 3). The two material layers are interconnected preferably at their rim portions (1') by being glued or pressed together by way of stamping. A germinating tape can be formed by means of a row of coherent germinating units. As a result the germinating unit and the germinating tape are produced in a very simple an cost-saving manner, and furthermore it is very environmentally acceptable. In addition, the germination can be efficiently controlled, and it is easy to mechanically bed out the germinating unit in the soil at a desired interval and a desired depth.

22 Claims, 4 Drawing Sheets

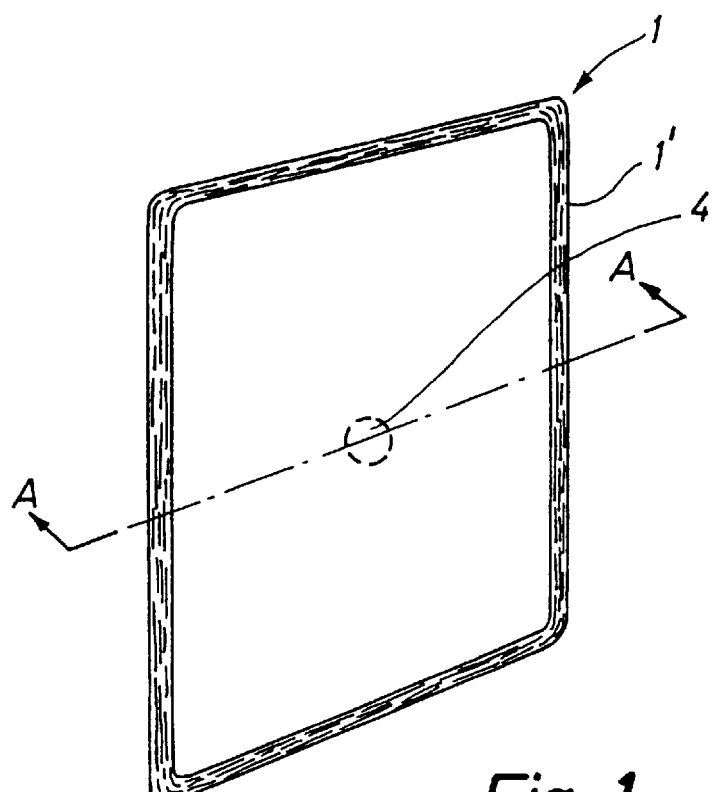
Fig. 1
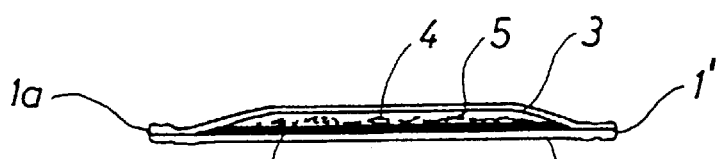
Fig. 2
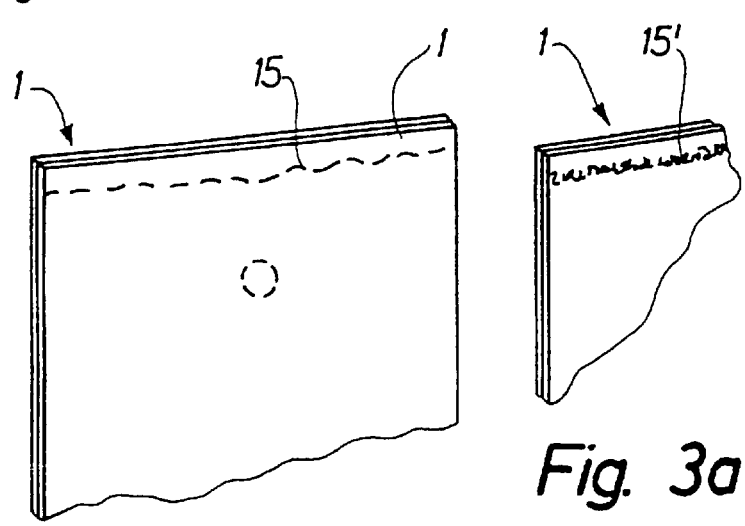
Fig. 3
Fig. 3a

GERMINATING UNIT, GERMINATING TAPE AND A METHOD OF PRODUCING GERMINATING UNITS OR GERMINATING TAPES, AS WELL AS AN ASSEMBLY FOR CARRYING OUT SAID METHOD

TECHNICAL FIELD

The invention relates to a germinating unit for germination of seeds and comprising two paper layers and at least one seed placed therebetween.

BACKGROUND ART

U.S. Pat. No. 4,369,599 discloses a cultivation "ball" formed by an elongated sleeve containing a substrate-containing filler. The sleeve encapsulates a seed or a plant and comprises at least one wall separating the plant from the substrate. The sleeve is made of a material impenetrable by the roots of the plant. The cultivation "ball" is produced in the following manner. A growth substrate is applied onto a first corrugated length of the wall material whereafter a second length of material is placed on top of the first length. Then the resulting tape is folded about its longitudinal axis whereby coherent cultivation "balls" are formed. Each cultivation "ball" comprises four cavities containing the growth substrate, and a plant or a seed is placed between said four cavities. When the cultivation "ball" is too large per see, it is possible to transversely cut said ball with the result that two small cultivation "balls" are formed.

This cultivation "ball" is encumbered with the draw-back that it is not suited for germination of seeds, and in addition the ball is very complicated and consequently very expensive to produce.

BRIEF DESCRIPTION OF THE INVENTION

The object of the invention is to provide a germinating unit of the above type which is simple and inexpensive to produce, which furthermore is particularly suited for a controlled germination of the plant seed, and which after a completed germination is suited for being mechanically bedded out in the soil at a desired interval and a desired depth as well.

The term "seed" is in this connection to be construed as covering not only natural seeds, but also growth-suited parts of plants, such as meristems or the like parts.

The germinating unit according to the invention is characterised in the features stated in the characterising part of claim 1. The resulting germinating unit can be produced in a particularly simple and cost-saving manner. In addition, the germination can be efficiently controlled, and it is easy to mechanically bed out the germinating units in the soil at desired intervals and at a desired depth. Moreover the germinating unit is environmentally acceptable.

The paper may according to the invention be of a weight not exceeding 50 g/m$^2$, preferably below 20 g/m$^2$. The paper can for instance be kraft paper. In this manner the germinating unit can be produced at a low price and be provided with a suitable strength.

According to the invention the micropores of the paper have been made by means of needles with a thickness of 0.15 to 0.30 mm. As a result air can easily reach the seed and the roots of the plant both before and during the germination of said seed, as well as during the continued growth of said seed.

The carrier in the germinating unit may according to the invention be vermiculite, perlite, zeolite, cellulose materials, such as oat bran, wheat bran, wood fibres, sphagnum, burned clay, rockwool or mixtures thereof.

According to the invention the additives may comprise one or more substances within: pesticides, including herbicides, insecticides, especially systemic insecticides, fungicides, virae and cultures of bacteria, cultures of fungi, such as Trichoderma, fungus spores, microencapsulated fungicides, eggs from useful insects, such as predatory nematodes, fertilizers, hormones, enzymes, pH-adjusting substances, carbon, clay particles, trace elements, such as molybdenum, wood fibres or wood powder, kieselguhr, surfactants, water-absorbing substances, such as superabsorbing polymer (SAP), carboxymethyl cellulose (CMD), silica and other additives with favourable effects on the germination and the growth of the plants, where several substances are available in microencapsulated form which provides the highest protection against biodegradation.

As the germinating unit comprises water-absorbing substances, it can contain more water than hitherto known at the same time as the seeds and the roots do not drown in water, but are surrounded by air almost saturated with vapour. The water reserve applies as balls or crystals of the water-absorbing substance with water and is released to the roots in response to the osmotic pressure, viz. the ratio of the salt concentration in the roots to the salt concentration outside said roots. The combination of the carrier and the additives and the binding of the latter to the carrier as well as their position relative to the seed render it possible to ensure optimum conditions for the germination of the seed and for the continued growth of the plant.

According to the invention the binder may comprise polyvinyl alcohol or polyethylene glycol or another plant-compatible binder, such as water or water containing a polysaccharide. The latter turned out to be particularly advantageous in practice because for instance the polysaccharide is able to simultaneously act as a nutrient absorbed into some of the added cultures.

Furthermore according to the invention one or more of the additives may be placed locally in areas of the germinating unit, especially by way of spraying in liquid state or by way of being put down in form of granules or powder, some of said areas of the germinating unit being positioned at a large distance from the seed with the effect that the concentration of the additives reaching said seed can be kept at a low level.

According to the invention a magnetic material, such as barium ferrite, iron fillings or iron wire, may be embedded in a rim portion of the germinating unit. When many germinating units are involved, and when these germinating units are randomly positioned, it is very easy to turn all these germinating units by means of a magnet owing to the magnetic material and thereby to orient them in the same direction.

According to the invention the material layers of the germinating unit may be easily penetrable by the roots and the top of the germinating plant, for instance by being provided with a plurality of holes or cuts, especially slots, whereby the roots and the top can grow through said holes or cuts. In this manner it is particularly easy for the roots and the top of the plant to penetrate through the germinating unit irrespective of the orientation of said germinating unit.

The holes or cuts, especially the slots may according to the invention preferably be of a diameter of 3 to 10 mm, be substantially circular or crescent-shaped, and be placed according to a regular pattern in the material layers. In this manner it is particularly easy for the roots and the top of the plant to find their way out of the germinating unit irrespective of the orientation of said germinating unit.

An embodiment of the germinating unit is characterised in the features stated in the characterising part of claim 12. Such a germinating tape renders it possible, if desired, to separate the germinating units from the tape one by one, which proved particularly advantageous when it is desired to bed out the germinating units one by one.

Another embodiment of the germinating unit of the invention is characterised by the features stated in the characterising part of claim 13. As a result the germinating tape can be used for bedding out coherent tape-shaped germinating units containing germinated seeds of plants presenting highly differing requirements to the distance between the plants.

According to the invention the germinating unit may continue directly into the neighbouring units, and the transition between two succeeding germinating units may be provided with one or more cuts or weakening lines, such as arrow-shaped cuts or weakening lines with interruptions in said cuts or weakening lines, whereby magnetic, optionally current-carrying wires may extend through said interruptions. Such a germinating tape can for instance be used for bedding out the germinating units separately by means of a bedding machine where the germinating units are torn off the tape during the bedding out. These wires in the tape can be used by a sorting process for determining regularities in the germination.

The invention relates also to a method of producing germinating units as stated in the characterising part of claim 15.

This method turned out to be particularly advantageous for ensuring a reliable packing of the seeds and the mixture in a closed germinating unit in such a manner that they do not fall out of said germinating unit.

A further particularly simple embodiment of the method according to the invention is characterised in that the interconnected lengths of paper are longitudinally cut between the rows of seeds and optionally also transversely cut between said seeds, whereby germinating tapes or separate germinating units are provided.

The invention relates furthermore to an assembly for carrying out the method according to the invention, and this assembly is characterised in the features stated in the characterising part of claim 17.

This assembly turned out to be particularly efficient for carrying out the method according to the invention.

Moreover, an additional station may according to the invention be coupled between the dispensing station for the mixture and the joining station, said additional station dispensing additives locally to the areas of each germinating unit. As a result the seed can, if desired, be kept at a distance from the additives for a predetermined period.

The assembly may according to the invention comprise a packing station adapted to pack the germinating units or the germinating tapes preferably in such a manner that said package is shrunk about said germinating units or said germinating tapes, or such that said package, such as a cardboard box, is adapted to receive a plurality of layers of the germinating units or the germinating tapes, said package optionally comprising separating sheets between the layers. In this manner it is possible in an easy manner to handle a large portion of germinating units or germinating tapes and furthermore to ensure that said germinating units or germinating tapes take up minimum room in storage and in transit prior to the germination. When the package is a plastic bag, the germinating units can be kept free of moisture.

The assembly may be formed as stated in the characterising part of claim 20. Finally the assembly may be formed as stated in the characterising part of claim 21.

BRIEF DESCRIPTION OF THE DRAWINGS

The invention is explained in detail below with reference to the accompanying drawing, in which FIG. 1 is a perspective view of a germinating unit according to the invention, FIG. 2 is a cross-sectional view of the germinating unit of FIG. 1 taken along the line A—A of FIG. 1, FIG. 3 illustrates a germinating unit, where an iron wire is embedded in the upper rim portion, FIG. 3a corresponds to FIG. 3, but where iron fillings are embedded instead of the iron wire.

BEST MODE FOR CARRYING OUT THE INVENTION

Figure 5:
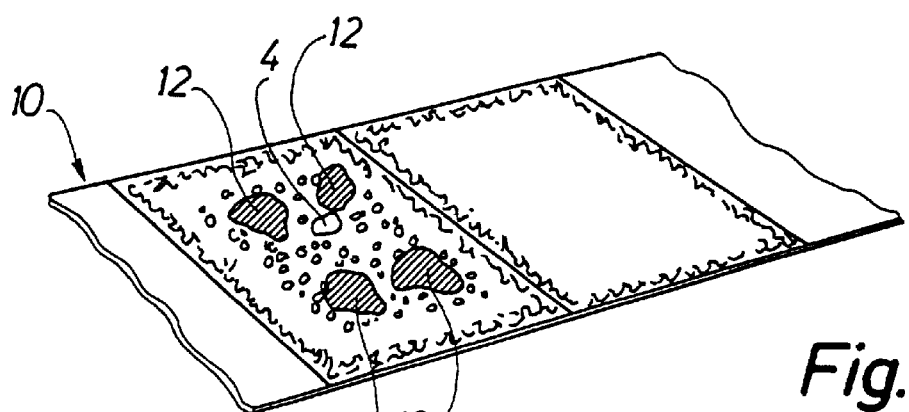
FIG. 5 is a perspective view of one material layer in a germinating tape, the carrier appearing uniformly distributed around the seed and the additives being locally placed, i.e. the germinating tape is shown during its production.

The germinating unit 1 illustrated in FIG. 1 is to be used for germination of seeds and comprises two layers 2 and 3 of paper and a seed 4 placed between said two layers, cf. FIG. 2. A mixture 5 of a carrier and additives is furthermore placed between the layers 2 and 3, said additives being permanently or loosely bound to the carrier by means of a binder not indicated. The seed and the mixture are attached to at least one of the layers, viz. the layer 2 in the illustrated embodiment, by means of a glue layer 6 on said layer 2. The two layers 2 and 3 are joined along their rim portions by being glued or pressed together. The gluing or pressing can, however, be carried out at a considerable distance from the rim portions of the layers 2 and 3, which, however, has not been illustrated.

The paper used is of a weight not exceeding 80 g/m$^2$, preferably not exceeding 50 g/m$^2$, especially maximum 20 g/m$^2$, and for instance be kraft paper.

At least one of the paper layers 2 and 3 is microporous and particularly transparent in the moist state, whereby a predetermined amount of light can penetrate to the seed 4, if desired.

The carrier in the mixture 5 can be vermiculite, perlite, zeolite, cellulose materials, such as wood fibres, oat bran, wheat bran, sphagnum, burned clay, rockwool or mixtures thereof.

The additives of the mixture 5 can comprise one or more substances within pesticides, including herbicides, insecticides, especially systemic insecticides, fungicides, virae and cultures of bacteria, cultures of fungi, such as Trichoderma, fungus spores, microencapsulated fungicides, eggs from useful insects, such as predatory nematodes, fertilizers, hormones, enzymes, pH-adjusting substances, carbon, clay particles, trace elements, such as molybdenum, wood fibres or wood powder, kieselguhr, surfactants, water-absorbing substances, such as superabsorbing polymer SAP), carboxymethyl cellulose (CMC), silica and other additives with favourable effects on the germination and the growth of the plants.

The binder used in the mixture 5 can comprise polyvinyl alcohol or polyethylene glycol or another plant-compatible binder, such as water or water containing a polysaccharide.

Figure 4:
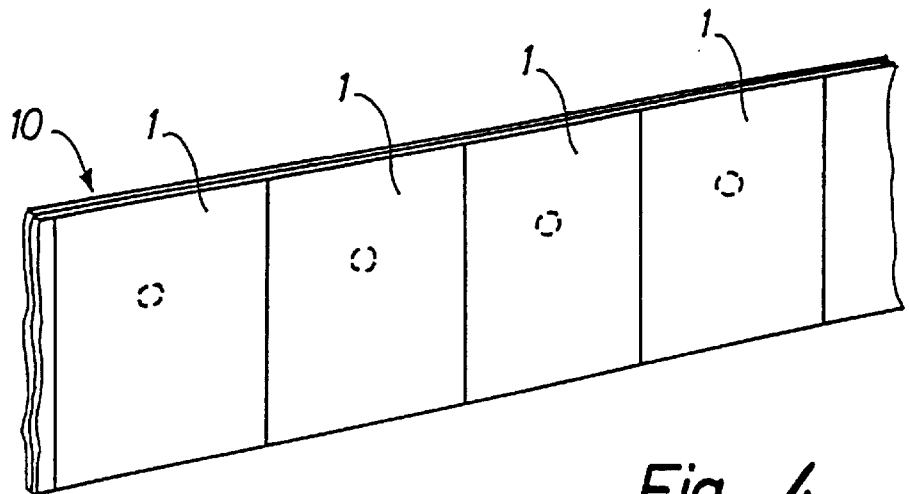
FIG. 4 is a perspective view of a germinating tape comprising many identical germinating units.

FIG. 4 shows a germinating tape 10 formed by several germinating units 1. In FIG. 5 the upper paper layer of the germinating tape has been omitted, and this Figure shows how the above additives can be dispensed locally in areas 12 of the germinating unit. Such a positioning of the additives can be ensured by said additives being sprayed in liquid state or by said substances being put down in form of granules or powder. The above areas 12 can be positioned at a predetermined distance from the seed.

As illustrated in FIG. 3, a magnetic material, such as an iron wire 15, can be embedded in the rim portion of the germinating unit 1, viz between the layers 2 and 3. A stripe of iron fillings 15', cf. FIG. 3a, can, however, also be embedded in said rim portion of the germinating unit 1. As an alternative it is also possible to insert barium ferrite.

Figure 6:
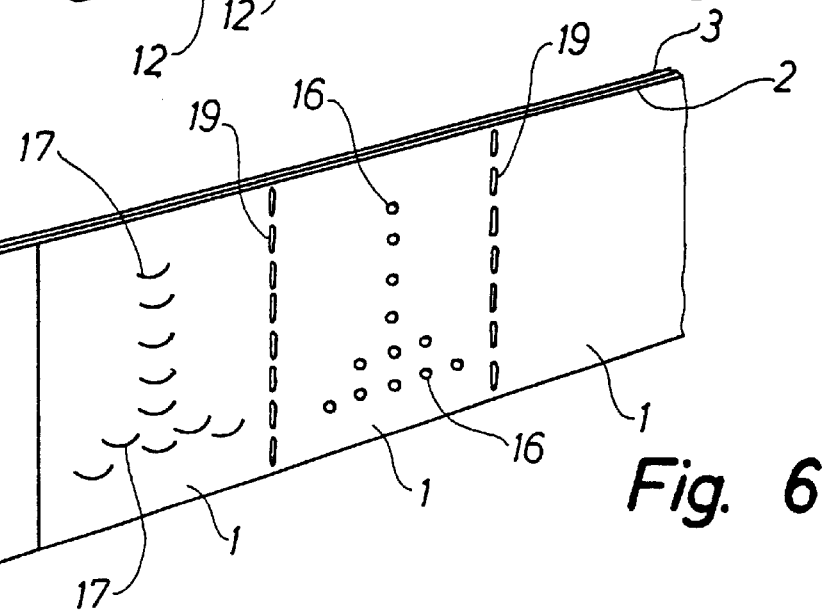
FIG. 6 shows a germinating tape, where cuts or holes are provided in each germinating unit, the top and the root of the radicle being able to penetrate out of said germinating unit through said holes or cuts.

As shown in FIG. 6, the material layers 2 and 3 of the germinating unit can be easily penetrable by the roots and the top of the germinating plant, for instance by being provided with a plurality of holes 16 or slots through which the roots and the top can grow.

These holes or slots are preferably of a diameter/extent of 3 to 10 mm, and they can be substantially circular or crescent-shaped, cf. at 16 and 17. In addition, they can be arranged in the material layers according to a regular pattern, optionally as a wide belt on a level with the seed.

The germinating units 1 in the germinating tape 10, cf. FIG. 4, can optionally be separated from said tape one by one.

Figure 7:
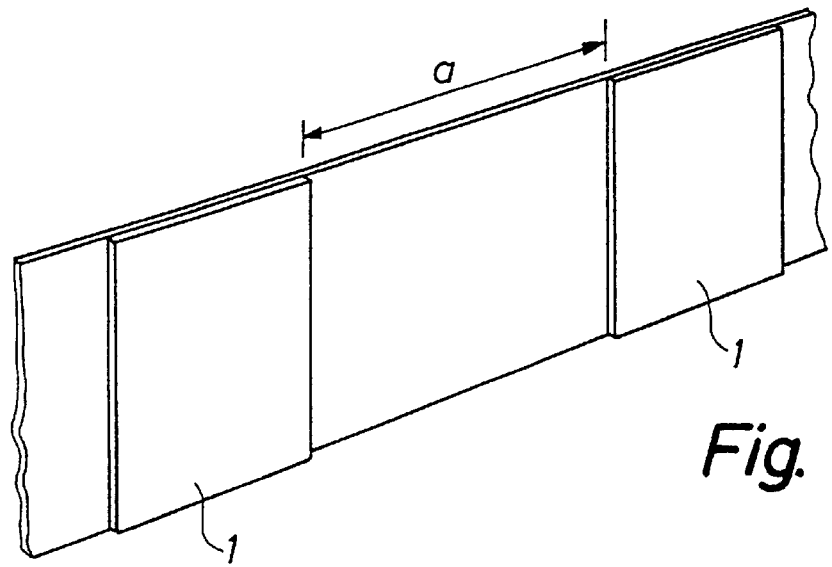
FIG. 7 shows a germinating tape, where the individual germinating units are arranged at a predetermined distance from one another.

As shown in FIG. 7, the individual germinating units 1 can be interspaced a predetermined distance a of 3 to 80 cm, and in this figure these germinating units are interconnected by means of intermediate lengths of merely one of the material layers, but two material layers may, however, also be used on this location.

FIG. 6 shows that the germinating units 1 can continue directly into one another, and that the transition between two succeeding germinating units can be provided with one or more cuts or weakening lines 19, such as arrow-shaped cuts or weakening lines with interruptions in said cuts or weakening lines, where magnetic, optionally current-carrying wires can extend through said interruptions, said wires not being shown.

The above germinating unit can be produced from a germinating tape by the germinating units being separated from the germinating tape one by one as mentioned above.

Figure 8:
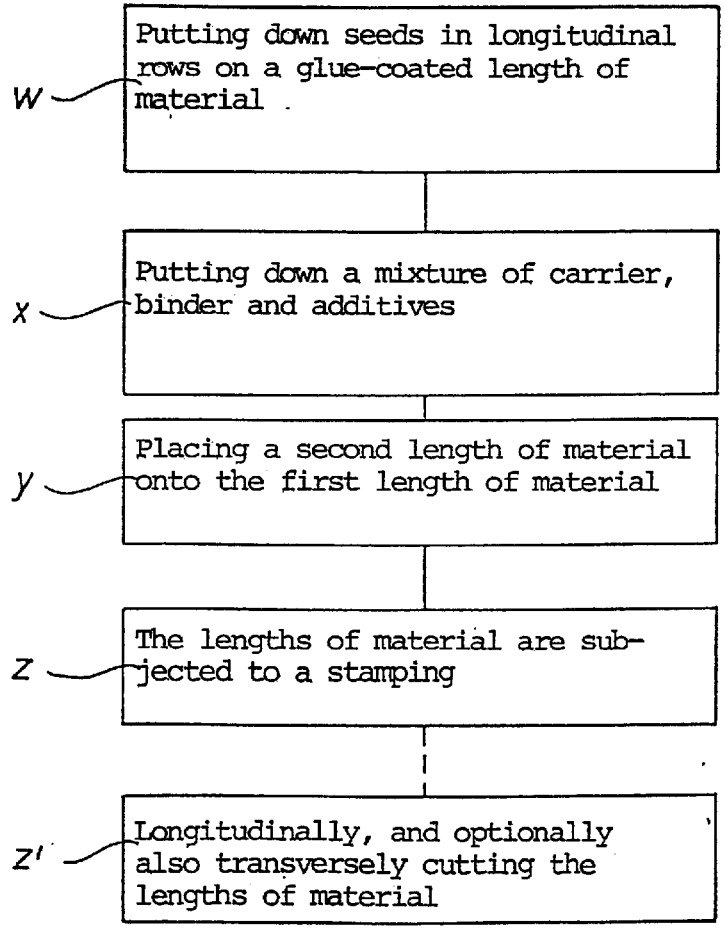
FIG. 8 is a diagrammatic view of the individual steps of the method according to the invention.

The germinating tape is produced in the following manner. Initially, cf. the step w in FIG. 8. seeds are put down onto a first length of material, preferably onto a glue layer placed on said length of material. The seeds are put down in rows in the longitudinal direction of the length of material with the result that said seeds are arranged at fixed regular intervals in said rows. Subsequently, cf. the step x in FIG. 8, a mixture of a carrier and additives bound to said carrier by means of a binder is put down around each seed. Now, cf. the step y in FIG. 8, a second length of material is placed on top of the first length of material. Finally, cf. the step z in FIG. 8, the two lengths of material are subjected to a stamping in the portions surrounding the seeds and the mixture so as to locally attach said lengths of materials to one another by way of gluing and/or pressing about the individual seeds and the mixture. Such a method turned out to be highly efficient.

The resulting germinating tape/germinating unit possess a good cohesion, which allows the top and the root of the plant to penetrate through said germinating tape/germinating unit.

The stamping can be established by means of two co-acting profiled wheels or rollers of a particular assembly, cf. below. These wheels or rollers can, if desired, simultaneously provide interrupted cuts or weakening lines in the lengths of material between the seeds in the rows.

As indicated at the step z', the interconnected lengths of material can be longitudinally cut between the rows of seeds with the result that germinating tapes are produced. A germinating tape is typically 10 to 40 mm wide, preferably 15 to 30 mm, and each length can typically be of a width corresponding to six to twelve germinating tapes. It is possible, if desired, to cut off or press out the germinating units from each of these germinating tapes.

Figure 9:
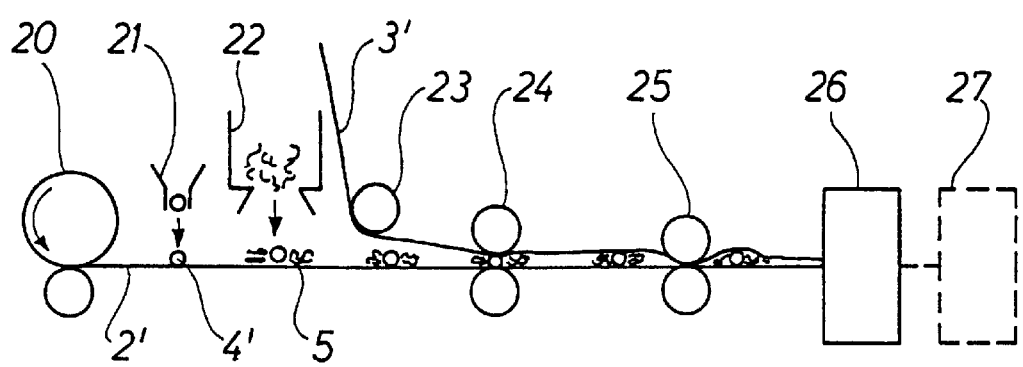
FIG. 9 is a diagrammatic view of the assembly according to the invention.

FIG. 9 is a diagrammatic view of an assembly for carrying out the method according to the invention. The assembly comprises a station 20, where a length of material 2' is pulled off, said length of material preferably being provided with a glue layer of the type: permanently adhesive. The assembly comprises furthermore a seed dispensing station 21 for dispensing seeds 4' onto the length of paper 2'. The seeds are arranged at regular intervals in rows in the longitudinal direction of the length of material. Moreover, a mixture dispensing station 22 is provided, which dispenses the previously described mixture 5 in portions onto the length of material 2' at or around each seed 4'. The second length of paper 3' is carried to a guide roller 23 and downwards and towards the second length of paper 2' at a joining station 24, where said lengths of material are joined. In addition, a pressing station 25 is provided for joining the two lengths of material in the portions between the seeds. This station can also provide interrupted cuts or weakening lines between the seeds in the rows by way of stamping, whereby the lengths of material are locally pressed together and/or towards one another around the individual seeds with the associated dispensed mixture. Moreover the assembly can comprise a cutting station 26 with a first set of cutting means for longitudinally cutting up the joined lengths of material between the rows of seeds, and a second set of cutting means for transversely cutting up said lengths of material between the seeds, if desired, the latter cutting also being diagrammatically shown. Finally, the assembly can comprise a packing station 27 adapted to pack the ready-made germinating units or germinating tapes in such a manner that the package used is preferably shrunk about said germinating units or germinating tapes.

Figure 10:
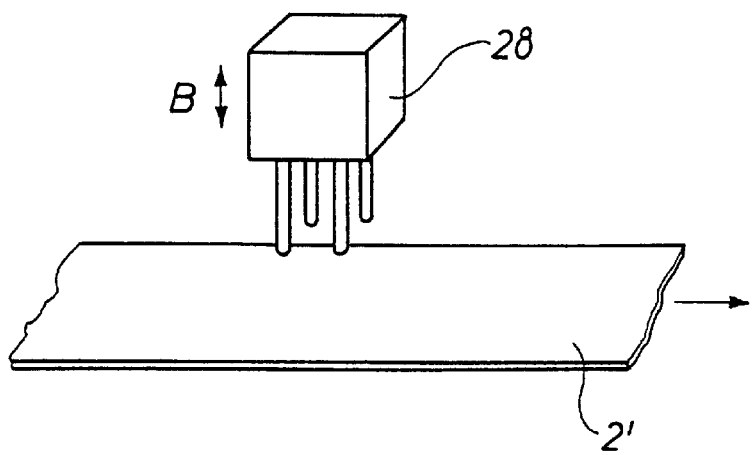
FIG. 10 is a perspective view of an additional station for dispensing the additives locally at or around each seed.

An additional station 28 can be coupled between the station 22 and the putting down of the second length of material 3', FIG. 10 being an enlarged view of said additional station 28. This additional station is used when the previously mentioned additives must be placed locally in areas around the germinating unit, viz. the germinating tape, and especially when said additives are to be applied by way of spraying in liquid state or by way of putting them down in form of granulates or powder, cf. the areas 12 in FIG. 5. A tube is provided on the bottom side of the additional station 28 for each of the desired areas 12. The additional station 28 can optionally be moved up and down, cf. the indication by way of the double arrow B to the very left of the Figure.

Prior to the bedding out, the germinating unit can, if desired, be subjected to a germinating process under optimum conditions, preferably in such a manner that the radicle has penetrated the seed coat in most cases.

FIGS. 1, 2 and 5 show the germinating unit provided with only one seed 4. Nothing, however, prevents each germinating unit from containing two or more seeds.

The term "paper" is in the present text to be construed broad as a material being biodegradable within the cultivation period of the culture in question.

The invention may be modified in many ways without thereby deviating from the scope of the invention as defined in the appended claim.

What is claimed is:

1. A germinating unit for germinating seeds and comprising two paper layers (2, 3; 2', 3') and at least one seed (4) placed therebetween, characterised in that a mixture (5) of a carrier and additives is placed between the paper layers, said additives being permanently or loosely bound to the carrier by means of a binder, and that said at least one seed (4) and the mixture (5) are adhered to at least one of the paper layers (2, 3; 2', 3'), said mixture being placed at or about the seed(s), and that two paper layers are joined along the rim portions (1') by being glued together and that at least one of the paper layers (2, 3; 2', 3') is microporous and is particularly transparent in the moist state and that the paper (2, 3; 2', 3') is of a weight not exceeding 80 g/m$^2$, and further characterised in that a magnetic material selected from the group consisting of barium ferrite, iron fillings (15') and iron wire (15), is embedded in a rim portion (1') of the germinating unit.

2. A germinating unit as claimed in claim 1, characterised in that the paper (2, 3; 2', 3') is of a weight not exceeding 50 g/m$^2$.

3. A germinating unit as claimed in claim 1, characterised in that the paper (2, 3; 2', 3') is of a weight not exceeding 20 g/m$^2$.

4. A germinating unit as claimed in claim 1, characterised in that at least one of the paper layers (2, 3; 2', 3') is made microporous by means of needles with a thickness of 0.15 to 0.30 mm.

5. A germinating unit as claimed in claim 1, characterised in that the additives are selected from the group consisting of pesticides, herbicides, insecticides, systemic insecticides, fungicides, virae, cultures of bacteria, cultures of fungi, Trichoderma, fungus spores, microencapsulated fungicides, eggs from useful insects, predatory nematodes, fertilizers, hormones, enzymes, pH-adjusting substances, carbon, clay particles, trace elements, molybdenum, wood fibres or wood powder, kieselguhr, surfactants, water-absorbing substances, superabsorbing polymer (SAP), carboxymethyl cellulose (CMC), silica and other additives with favourable effects on the germination and the growth of plants, where several of said substances are available in microencapsulated form.

6. A germinating unit as claimed in claim 1, characterised in that the binder is selected from the group consisting of polyvinyl alcohol, polyethylene glycol, another plant-compatible binder, water and water containing a polysaccharide.

7. A germinating unit as claimed in claim 1, characterised in that at least one of the additives is placed locally in areas (12) of said germinating unit, by way of spraying in liquid state.

8. A germinating unit as claimed in claim 1, characterised in that the paper layers (2, 3; 2', 3') of the germinating unit are easily penetrable by the germinating plant by being provided with a plurality of openings, whereby the roots and the top of said germinating plant can grow through said openings.

9. A germinating unit as claimed in claim 8, characterised in that the openings are of a diameter of 3 to 10 mm, and substantially circular, and are placed according to a regular pattern in the material layers.

10. A germinating unit as claimed in claim 8, characterised in that the openings are of a diameter of 3 to 10 mm, and substantially crescent-shaped, and are placed according to a regular pattern in the material layers.

11. A germinating unit as claimed in claims 1, characterised in that said unit may be connected to a plurality of similar juxtaposed germinating units (1) so as to form a germinating tape (10), and that the germinating units, can be separated from the tape one by one.

12. A germinating unit as claimed in claim 11, characterised in that there is a neighboring unit and the interspace between said unit and the neighboring unit is 3 to 80 cm, and that the units are interconnected by means of intermediate lengths of at least one of the two paper layers used.

13. A germinating unit as claimed in claim 11, characterised in that there are neighboring units and said unit continues directly into the neighboring units, and that the transition between two succeeding germinating units is provided with one or more cuts or weakening lines (19) with interruptions in said cuts or weakening lines.

14. A method of producing germinating units as claimed in claim 1, characterised in that seeds are put down in rows on a first length of paper on a glue layer placed thereon, the paper being particularly transparent in the moist state, said rows extending in the longitudinal direction of said length of paper in such a manner that said seeds are fixed at regular intervals in the rows, and that a mixture of a carrier and additives permanently or loosely bound to said carrier by means of a binder is put down at or about each seed, and that subsequently a second length of paper is placed on top of the first paper, and that the two lengths of paper are pressed together in areas surrounding the seeds and the mixture so as to locally fix the lengths of paper to one another by way of gluing about the individual seeds and the mixture.

15. A method as claimed in claim 14, characterised in that the lengths of paper are longitudinally cut between the rows of seeds and also transversely cut between said seeds, whereby germinating tapes or separate germinating units are provided.

16. An assembly for carrying out the method as claimed in 14, characterised in that the assembly comprises a device for advancing a first length of paper (2') in a substantially horizontal plane, the paper being particularly transparent in the moist state and having a weight not exceeding 80 g/m$^2$, a seed dispensing station (21) for putting down seeds onto the first length of paper (2') provided with a glue layer in such a manner that the seeds (4) are arranged at regular intervals in rows extending in the longitudinal direction of said length of paper, a mixture dispensing station (22) for placing a mixture (5) at or about each seed, said mixture comprising a carrier and additives which are permanently or loosely bound to each other by means of a binder, a joining station (24) for lowering a second length of paper onto the first length of paper, a pressing station (25) for joining the two lengths of paper in the areas between the seeds (4'), said lengths of paper (2', 3') being locally pressed together around the individual seeds with the associated dispensed mixture, and a cutting station (26) with a first set of cutting means for longitudinally cutting the lengths of paper between the rows of seeds.

17. An assembly as claimed in claim 16, characterised in that an additional station (28) is coupled to the dispensing station (22) for the mixture and the joining station (24), said additional station dispensing additives locally to the areas (12) of each germinating unit (1).

18. An assembly as claimed in claim 16, characterised in that said assembly comprises a packing station (27) adapted to pack the germinating units or the germinating tapes in such a manner that said package is shrunk about said germinating units or said germinating tapes, or such that said package, is adapted to receive a plurality of layers of germinating units or germinating tapes, said package comprising separating sheets between the layers.

19. An assembly as claimed in claim 16, further comprising a second set of cutting means for transversely cutting the interconnected lengths of paper.

20. An assembly as claimed in claim 16, characterised in that the pressing station (25) is adapted to provide interrupted cuts or weakening lines (19) between the seeds in the row by the pressing.

21. A germinating unit as claimed in claim 1, characterised in that at least one of the additives is placed locally in areas (12) of said germinating unit, by way of being put down in form of granules.

22. A germinating unit as claimed in claim 1, characterised in that at least one of the additives is placed locally in areas (12) of said germinating unit, by way of being put down in form of powder.

* * * * *